July 8, 1958     J. CAMPO     2,842,379
ANIMAL-SHAPED BICYCLE ATTACHMENTS
Filed April 26, 1955
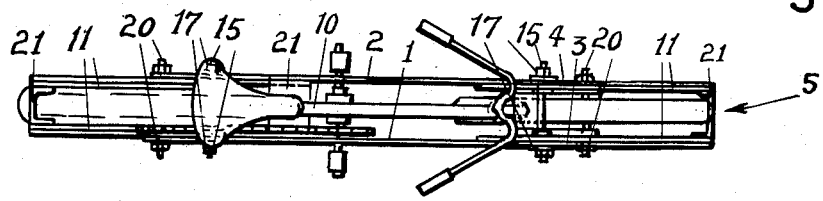
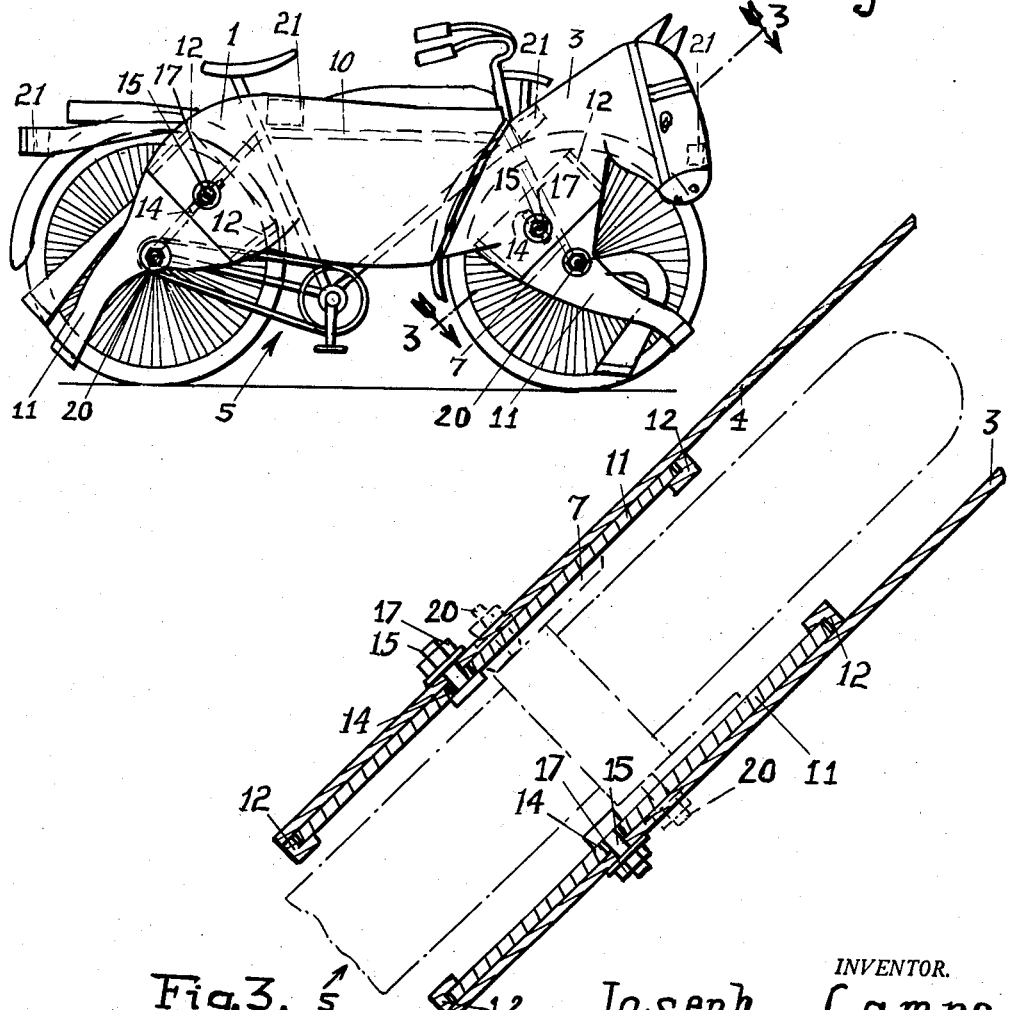
INVENTOR.
Joseph Campo
BY Henry J. S. Metzler
Attorney

2,842,379
ANIMAL-SHAPED BICYCLE ATTACHMENTS

Joseph Campo, Lindenhurst, N. Y.

Application April 26, 1955, Serial No. 503,919

3 Claims. (Cl. 280—1.204)

The present invention relates to improvements in bicycle attachments for children, and more specifically to the type of devices which may be classified under hobby horse and bicycle or tricycle combinations. These combinations usually have an imitation of the body of an animal provided with wheels and pedals so as to constitute a bicycle, or a tricycle, whose body looks like that of an animal, preferably of a horse. These devices are heavy in weight and expensive, so that their use has been very limited.

Therefore, one object of the present invention is the provision of a device of the character described which consists of only a pair of inexpensive, light-weight plate members that can be attached easily and quickly to any bicycle or tricycle and which are constructed and arranged for covering and camouflaging both sides of the major portions of the cycle, thus giving the same substantially the appearance of a toy animal without to any considerable degree reducing the useability of the cycle as a practical means of transportation.

Another object of the present invention is the provision of a device of the character described which can be detached from the bicycle, so that a child who has outgrown his hobby horse can still use the cycle without the animal body attachment.

A further object of the present invention is the provision of a device of the character described which is simple in construction and inexpensive to manufacture, but which is also of a pleasing outer appearance, sturdy, durable, and well adapted for withstanding the rough usage to which toys of this type usually are subjected.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawing a preferred form of the invention has been shown.

Figure 1 is a top plan view of a preferred embodiment of my invention;

Fig. 2 is a side view thereof; and,

Fig. 3 is a fractional enlarged sectional view on the line 3—3 of Fig. 2.

Similar reference characters refer to similar parts throughout the several views.

In the drawing the numerals 1 and 2 denote a pair of first plates of sheet metal, plastic material, or of any other suitable material, which are formed so as to represent the outline of the main body portion of an animal, and the numerals 3 and 4 denote a pair of second plates which are formed so as to represent the outline of the neck and head portions of an animal. These plates can be secured to both sides of a bicycle 5 by any suitable means, such as clamps or the like, in such a manner that the plates 3 and 4 are attached to the front wheel fork 7 while the plates 1 and 2 are attached to the frame 10 of the bicycle 5. The plates 3 and 4 have straight downwardly and rearwardly inclined back edges (Fig. 2), and the plates 1 and 2 have straight downwardly and rearwardly inclined front edges which are parallel to, and slightly spaced from, said straight back edges of the plates 3 and 4. Thus the steering will not be impaired because the plates 3 and 4, which are separated from the plates 1 and 2 can move freely with the fork 7. The plates may be painted according to the animals they are to represent.

In order to make the device adjustable, so that it will fit various sizes of cycles, I prefer to make plates 11 shaped as the leg portions of said animal body as separate units and to attach them slidably to the plates 1 and 2 as well as 3 and 4 respectively. I prefer to carry out this feature of my invention in the manner shown in the drawing, where it will be seen that guide rails 12 are secured to the inner sides of the plates 1, 2, 3 and 4, and the members 11 are slidably arranged in the same. A slot 14 is provided in each member 11, and a bolt 15 extends through the same as well as through holes in the plates 1, 2, 3 and 4. After adjustment, the plates 11 can be retained in adjusted positions by tightening nuts 17 on the bolts 15.

The members 11 also are provided with holes through which extend the hub bolts 20 of the front and rear axles of the cycle 5, so that the device can be secured to the cycle also by means of the hub bolt nuts. The plates at each side of the cycle preferably are joined to each other by means of braces 21 or the like for stiffening the device and for making it sturdy.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A bicycle attachment comprising two pairs of lightweight flat members of which the first two have the outline of the front portion of an animal body and the second two have the outline of the main and rear portions of an animal body, braces connecting the upper portions of each pair of said flat members to each other, parallel guide members on the inner extremities of said flat members, and two pairs of plates representing animal legs being secured to the wheel axles of a bicycle and having parallel edge portions which are slidable in said guide members for adjustment purposes, said flat members and said plates being constructed and arranged for covering and camouflaging both sides of the major portions of a bicycle.

2. A device of the character described comprising two pairs of flat members of which the first pair have the outline of the head and chest portions of an animal body while the second pair have the outline of the main trunk and rear portions of an animal body, braces securing the upper portions of each pair of said flat members to each other, parallel guide members provided on the inner extremities of said flat members, and two pairs of plates representing animal legs having parallel edge portions which can be slid in said guide members and have holes through which hub bolts of the front and rear axles of a bicycle extend, said first pair of flat members having straight rearwardly inclined back edges while the second pair of said flat members have straight rearwardly and downwardly inclined front edges which, when said flat members are secured to a bicycle, are parallel to and slightly spaced from said straight back edges of the first pair of flat members.

3. An animal-shaped bicycle attachment, comprising two pairs of flat plates having rectangular upper portions provided with slots and having also lower portions which have the outline of animal legs and which are provided with holes through which the end portions of the front and rear axles of a bicycle extend, two pairs of flat members of which the first pair have the ontline of the head and chest portions of an animal body while the second pair have the outline of the main trunk and rear portions of an animal body, braces securing the upper portions of each pair of said flat members to one another, guide members into which are slid the rectangular portions of said flat plates being mounted on the inner extremities of said flat members, and bolts extending through the slots in the rectangular upper portions of said flat plates as well as through said flat members for retaining the latter on the former after adjustment thereof.

References Cited in the file of this patent

UNITED STATES PATENTS

| | | |
|---|---|---|
| 1,176,876 | Vartabedian | Mar. 28, 1916 |
| 2,518,899 | Kelleher | Aug. 15, 1950 |
| 2,599,309 | Wunderly | June 3, 1952 |
| 2,643,133 | Lucchesi | June 23, 1953 |
| 2,646,990 | Fowler | July 28, 1953 |